US010402737B1

(12) United States Patent
Malalel et al.

(10) Patent No.: US 10,402,737 B1
(45) Date of Patent: *Sep. 3, 2019

(54) SYSTEM, METHOD, AND COMPUTER PROGRAM FOR PROVIDING PROACTIVE CUSTOMER CARE FOR ISSUES ASSOCIATED WITH SETTING UP THE BILLING PROCESS AS PART OF THE ORDERING PROCESS

(71) Applicant: Amdocs Software Systems Limited, Dublin (IE)

(72) Inventors: Leon Malalel, Kfar Yona (IL); Peter John Cogan, Sandyford (IE)

(73) Assignees: AMDOCS DEVELOPMENT LIMITED, Limassol (CY); AMDOCS SOFTWARE SYSTEMS LIMITED, Dublin (IE)

( * ) Notice: Subject to any disclaimer, the term of this patent is extended or adjusted under 35 U.S.C. 154(b) by 886 days.

This patent is subject to a terminal disclaimer.

(21) Appl. No.: 14/521,380

(22) Filed: Oct. 22, 2014

(51) Int. Cl.
| | | |
|---|---|---|
| *G06E 1/00* | (2006.01) | |
| *G06E 3/00* | (2006.01) | |
| *G06F 15/18* | (2006.01) | |
| *G06G 7/00* | (2006.01) | |
| *G06N 7/00* | (2006.01) | |
| *H04L 29/08* | (2006.01) | |

(52) U.S. Cl.
CPC .............. *G06N 7/005* (2013.01); *H04L 67/10* (2013.01)

(58) Field of Classification Search
CPC .. G06E 1/00; G06E 3/00; G06F 15/18; G06G 7/00
USPC .......................................................... 706/21
See application file for complete search history.

(56) References Cited

U.S. PATENT DOCUMENTS

| | | | |
|---|---|---|---|
| 5,907,800 A | 5/1999 | Johnson et al. | |
| 6,301,471 B1 | 10/2001 | Dahm et al. | |
| 6,677,963 B1 | 1/2004 | Mani et al. | |
| 7,536,002 B1* | 5/2009 | Ma .......................... | H04M 3/493 379/265.02 |
| 7,909,241 B2* | 3/2011 | Stone .................... | G06Q 10/087 235/376 |
| 8,351,344 B2* | 1/2013 | Jung .................... | H04L 41/5009 370/252 |
| 8,442,959 B2 | 5/2013 | Sebastian | |

(Continued)

OTHER PUBLICATIONS

Barkan, G. et al., U.S. Appl. No. 14/244,833, filed Apr. 3, 2014.

(Continued)

*Primary Examiner* — Robert A Cassity
*Assistant Examiner* — Peter Coughlan
(74) *Attorney, Agent, or Firm* — Zilka-Kotab, P.C.

(57) ABSTRACT

A system, method, and computer program product are provided for providing proactive customer care for issues associated with billing or ordering processes. In use, a likelihood that a customer is going to call a call center to address at least one issue associated with at least one of an ordering process or a billing process is predicted. Additionally, it is determined whether the customer is likely to call the call center based on the predicted likelihood that the customer is going to call the call center. Further, the customer is proactively notified before the customer contacts the call center, if it is determined that the customer is likely to call the call center.

8 Claims, 4 Drawing Sheets

(56) References Cited

U.S. PATENT DOCUMENTS

| | | | | |
|---|---|---|---|---|
| 8,521,572 | B2* | 8/2013 | Hanson | G06Q 30/02 |
| | | | | 379/265.03 |
| 8,712,828 | B2* | 4/2014 | Maga | G06Q 30/02 |
| | | | | 705/14.45 |
| 8,756,088 | B2 | 6/2014 | Lampe et al. | |
| 8,768,840 | B2* | 7/2014 | Bozeman | G06Q 20/04 |
| | | | | 235/379 |
| 8,825,513 | B1 | 9/2014 | Misra et al. | |
| 9,165,556 | B1 | 10/2015 | Sugar et al. | |
| 9,178,999 | B1 | 11/2015 | Hegde et al. | |
| 9,420,100 | B2 | 8/2016 | Bellini et al. | |
| 9,467,567 | B1* | 10/2016 | Barkan | G06Q 10/00 |
| 2003/0126103 | A1 | 7/2003 | Chen et al. | |
| 2004/0249927 | A1 | 12/2004 | Pezutti | |
| 2005/0135593 | A1 | 6/2005 | Becerra et al. | |
| 2005/0203817 | A1 | 9/2005 | Abo-Hasna et al. | |
| 2006/0026011 | A1* | 2/2006 | Verego | G06Q 30/02 |
| | | | | 705/7.11 |
| 2007/0018586 | A1 | 1/2007 | Yagi et al. | |
| 2008/0208786 | A1 | 8/2008 | Serrano-Morales et al. | |
| 2010/0135171 | A1 | 6/2010 | Jung et al. | |
| 2011/0299676 | A1 | 12/2011 | Hanson et al. | |
| 2011/0307257 | A1 | 12/2011 | Pereg et al. | |
| 2014/0108202 | A1 | 4/2014 | Masuko | |
| 2014/0177544 | A1 | 6/2014 | Kumar et al. | |
| 2014/0201084 | A1 | 7/2014 | Dagenais et al. | |
| 2014/0280877 | A1 | 9/2014 | Koulomzin | |
| 2016/0005049 | A1* | 1/2016 | Menezes | G06Q 30/016 |
| | | | | 705/7.28 |

OTHER PUBLICATIONS

Cogan et al., U.S. Appl. No. 14/514,249, filed Oct. 14, 2014.
Non-Final Office Action from U.S. Appl. No. 14/514,249, dated Dec. 30, 2016.
Final Office Action from U.S. Appl. No. 14/514,249, dated Jun. 23, 2017.
Advisory Action from U.S. Appl. No. 14/514,249, dated Sep. 1, 2017.
Non-Final Office Action from U.S. Appl. No. 14/514,249, dated Nov. 13, 2017.
Final Office Action from U.S. Appl. No. 14/514,249, dated Jun. 6, 2018.
Advisory Action from U.S. Appl. No. 14/514,249, dated Aug. 24, 2018.
Non-Final Office Action from U.S. Appl. No. 14/514,249, dated Nov. 26, 2018.
Final Office Action from U.S. Appl. No. 14/514,249, dated May 13, 2019.

* cited by examiner

SYSTEM, METHOD, AND COMPUTER PROGRAM FOR PROVIDING PROACTIVE CUSTOMER CARE FOR ISSUES ASSOCIATED WITH SETTING UP THE BILLING PROCESS AS PART OF THE ORDERING PROCESS

FIELD OF THE INVENTION

The present invention relates to product and service providers, and more particularly to providing proactive customer care to customers of such providers.

BACKGROUND

Customer loyalty and satisfaction are becoming increasingly important to the success of businesses. Issues that arise during an order process have the potential to influence customer loyalty and satisfaction.

Ordering is essentially a flow of actions that arise in response to a customer placing an order. Such an order may be for the provision of internet services, fixed line services, television, mobile subscriptions, or modifications and deletions of existing installations of such services, etc.

Ordering can be extremely complex and involves negotiation with the customer (e.g. to configure the product, determine pricing, collect billing/address information, etc.) followed by a provisioning system that connects with multiple independent systems related to port provisioning, account creation, billing setup, and address verification, etc.

Often, customers will call a call center when issues arise during the ordering process. Such calls may be a result of problems in the process, missing a due date, and other technical issues that prevent the completion of the order, as was planned originally. Handling calls at a call center is costly and pulls call agents away from working on other productive items.

There is thus a need for addressing these and/or other issues associated with the prior art.

SUMMARY

A system, method, and computer program product are provided for providing proactive customer care for issues associated with billing or ordering processes. In use, a likelihood that a customer is going to call a call center to address at least one issue associated with at least one of a billing or ordering process is predicted. Additionally, it is determined whether the customer is likely to call the call center based on the predicted likelihood that the customer is going to call the call center. Further, the customer is proactively notified before the customer contacts the call center, if it is determined that the customer is likely to call the call center.

DETAILED DESCRIPTION

Figure 1:
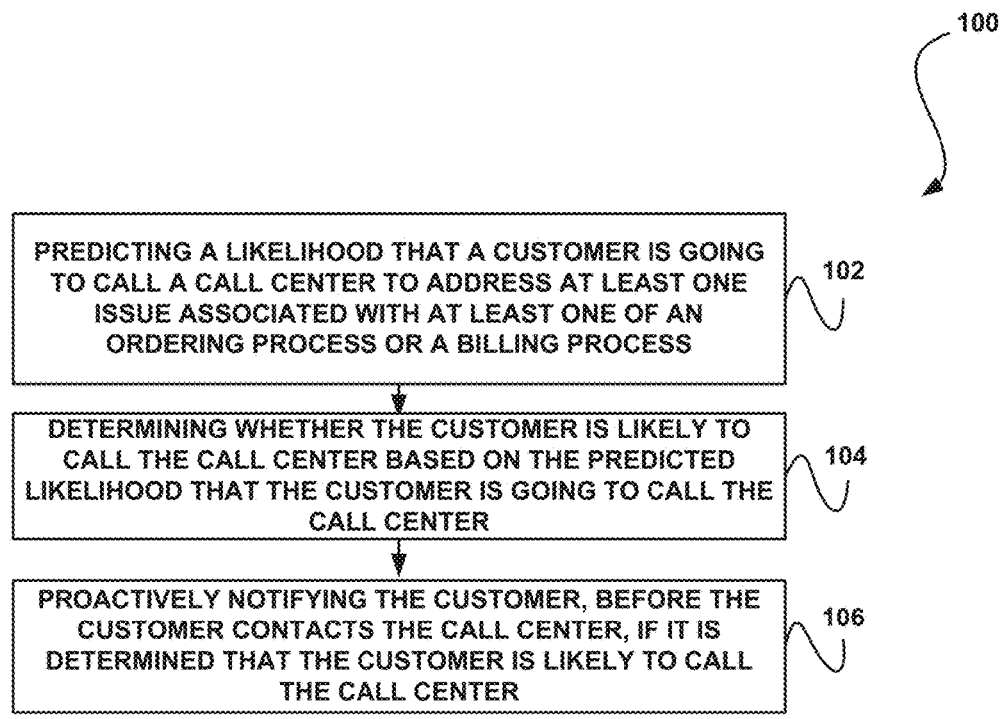
FIG. 1 illustrates a method for providing proactive customer care for issues associated with billing or ordering, in accordance with one embodiment.

FIG. 1 illustrates a method 100 for providing proactive customer care for issues associated with billing or ordering, in accordance with one embodiment.

As shown, a likelihood that a customer is going to call a call center to address at least one issue associated with at least one of an ordering process or a billing process is predicted. See operation 102. The issue may be any issue associated with a product and/or service and/or an ordering or billing process associated therewith. For example, issues related to setting up the billing process that occur at the same time as the ordering process may be detected.

Additionally, it is determined whether the customer is likely to call the call center based on the predicted likelihood that the customer is going to call the call center. See operation 104.

Further, the customer is proactively notified before the customer contacts the call center, if it is determined that the customer is likely to call the call center. See operation 106.

The proactive notification may include any type of notification. For example, in one embodiment, proactively notifying the customer may include proactively notifying the customer utilizing at least one text message. In another embodiment, proactively notifying the customer may include proactively notifying the customer utilizing at least one email. Of course, any notification may be utilized in various embodiments (e.g. based on a customer preference, etc.)

Further, proactive notifications may include any information associated with the issue, a product or service associated with the issue, and/or various other information. For example, proactively notifying the customer may include proactively notifying the customer that the issue is being addressed or has been addressed.

Furthermore, predicting the likelihood that the customer is going to call the call center may include a variety of techniques. For example, predicting the likelihood that the customer is going to call the call center may include predicting that the customer is going to call the call center within a specific time period.

Additionally, in one embodiment, predicting the likelihood that the customer is going to call the call center may include predicting the likelihood the customer is going to call the call center based on historical information associated with the customer. The historical information associated with the customers may include any type of past data. For example, the historical information may include a number of times a customer has contacted (e.g. called, emailed, etc.) a call center associated with a service provider, dates of the contacts, reasons for the contacts, and/or various other historical data associated with the customer. In one embodiment, the historical data may be stored in one or more databases associated with a service provider.

Further, in one embodiment, the historical information associated with the customer may be utilized to generate a behavior model for the customer. In this case, the behavior model for the customer may indicate a propensity for the customer to call the call center. In one embodiment, the behavior model for the customer may indicate a likelihood that proactively notifying the customer will backfire.

In another embodiment, at least one classification algorithm or model may be utilized to predict the likelihood that the customer is going to call the call center. In this case, the classification algorithm may utilize information from an order management system, a customer management system, and/or a system including demographic data to predict the likelihood that the customer is going to call the call center. In one embodiment, the classification algorithm may utilize historical information from an order management system, a customer management system, and/or a system including demographic data to predict the likelihood that the customer is going to call the call center.

Additionally, in one embodiment, the classification algorithm may be updated with currently received information (e.g. from the various systems, etc.). For example, the classification algorithm may be continuously updated in real time with the currently received information.

In one embodiment, the classification algorithm may be utilized to generate at least one call propensity model indicating a call propensity of a plurality of customers. As an option, the classification algorithm may be part of a big data analytics platform.

Further, in one embodiment, the method 100 may include predicting whether proactively notifying the customer will backfire. In this case, the customer may not be proactively notified if it is determined that proactively notifying the customer will backfire. A backfire refers to a case when a customer notifies the call center because the customer was proactively notified.

The method 100 addresses issues that may arise during an ordering process. The ordering process is essentially a flow of actions that arise in response to a customer placing an order. Such an order may be for the provision of internet services, fixed line services, television, mobile subscriptions or modifications and deletions of existing installations of such services, etc.

Ordering can be extremely complex and involves negotiation with the customer (e.g. to configure the product, determine pricing, collect billing/address information, etc.) followed by a provisioning system that connects with multiple independent systems related to port provisioning, account creation, billing setup, and address verification, etc.

The method 100 may be implemented to address ordering related calls to the call center, which are initiated by the customers. Specifically, the method 100 may address calls during the fulfillment phase of the order, once the negotiation phase is completed. Such calls may be a result of problems in the process, missing the due date, and other technical issues that prevent the completion of the order, as was planned originally.

Incoming calls are very costly to the service providers. Such calls may be prevented by proactively notifying the customer, by the service provider, using SMS, email, mail, etc. Each call that is prevented saves money and releases the agent to conduct more productive calls.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
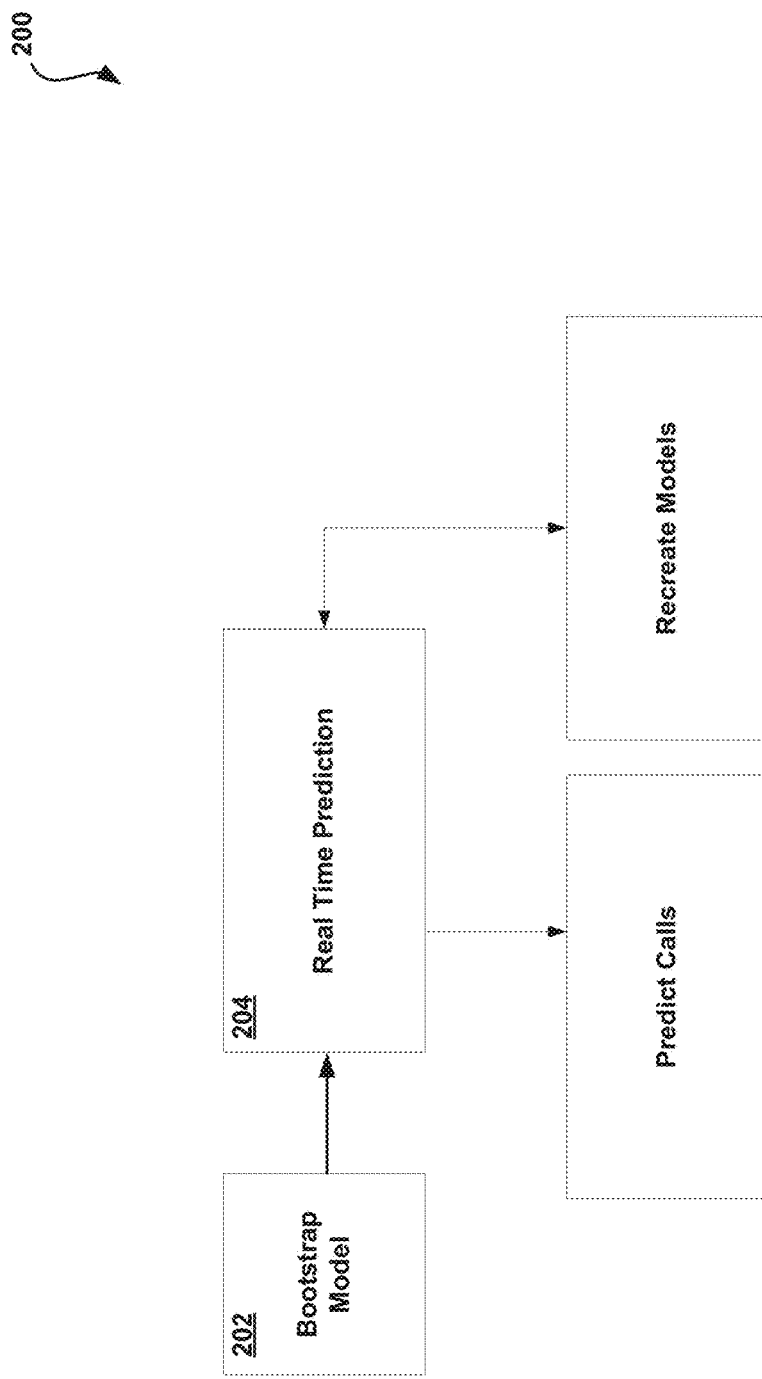
FIG. 2 illustrates a system for providing proactive customer care for issues associated with billing or ordering, in accordance with one embodiment.

FIG. 2 illustrates a system 200 for providing proactive customer care for issues associated with billing or ordering, in accordance with one embodiment. As an option, the system 200 may be implemented in the context of the details of FIG. 1. Of course, however, the system 200 may be implemented in the context of any desired environment. Further, the aforementioned definitions may equally apply to the description below.

As shown, the system 200 includes a bootstrap model 202 and a real time prediction module 204 for predicting and handling incoming calls due to ordering issues. The real-time prediction module 204 is capable of being updated based on information received in real-time.

In one embodiment, the system 200 may be implemented as a big data analytics application to predict the likelihood that a customer will call a call center with a particular issue (e.g. ordering and billing processes issues, etc.) in a given time window (e.g. in an ordering case, during the fulfillment process until notification; and in a billing case, while modifying the billing process as a result of the order; etc.).

For those with a high likelihood to call, proactive notifications may be sent to the identified customers, notifying them in advance of any issue and ensuring things are in control. The system 200 may also function to predict which notifications might backfire (i.e. the customer will call as a result of the proactive notification).

The proactive notifications will reduce the number of calls of the customers to the call centers, thus saving money for the service providers. The past behavior of the service provider customers may be used to create behavioral models. The models may be used to predict future calls before they take place Thus, the system 200 is a real time system that may ingest data directly from various systems including order management systems, customer management systems, and also ingest demographic data to generate predictions as to whether a customer will call about an identified issue and whether proactively notifying the customer will cause a backfire.

Although this is a real time, continuous learning system, the initial deployment of the architecture may be bootstrapped using historical data (e.g. generating the bootstrap model 202). To achieve this, an extraction of ordering, customer, and demographic data may be acquired and each order may be labelled according to a corresponding end state. For example, there may be two labels, Call and OK, where OK refers to customers that did not call the call center. In one embodiment, the system 200 may utilize a binary classification algorithm that can be trained to differentiate between the class types (e.g. utilizing machine learning, etc.).

Once the system 200 is deployed, the system may continuously relearn the classification model to predict which orders/customers will initiate incoming calls. This is useful since the ordering system itself may be subjected to dynamic external influences that would not be captured by the initial bootstrap model 202.

For example, local issues could trigger delays that would impact customer satisfaction and trigger calls and complaints. Similarly, new faulty advertising could result in misinformed customers ordering a product that is different from what they expect, leading to a bad experience and complaints.

Accordingly, the system 200 may function such that an order and/or customer that is predicted to initiate and incoming call may be handled in a proactive way that will prevent the incoming call and also prevent any backfire.

This system 200 relies on the classification paradigm in machine learning. Various algorithms may be suitable for such classification. As one example, a random forest algorithm may be utilized.

Moreover, any information may be used to predict the likelihood a customer will call, generate a call model, predict the likelihood of a backfire, and/or generate a backfire propensity model. For example, such information may include information associated with: customer demographics (e.g. for one customer or across an entire customer base, etc.), customer purchases (e.g. for one customer or across an entire customer base, etc.), customer billing information (e.g. for one customer or across an entire customer base, etc.), customer usage (e.g. for one customer or across an entire customer base, etc.), and/or customer notification information (e.g. for one customer or across an entire customer base, etc.).

Figure 3:
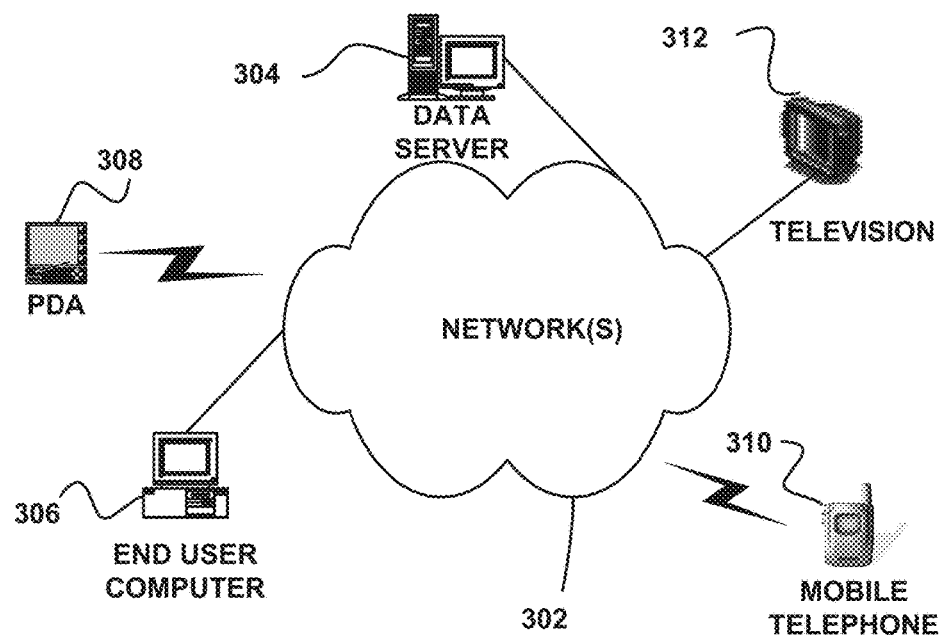
FIG. 3 illustrates network architecture, in accordance with one possible embodiment.

FIG. 3 illustrates a network architecture 300, in accordance with one possible embodiment. As shown, at least one network 302 is provided. In the context of the present network architecture 300, the network 302 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 302 may be provided.

Coupled to the network 302 is a plurality of devices. For example, a server computer 304 and an end user computer 306 may be coupled to the network 302 for communication purposes. Such end user computer 306 may include a desktop computer, lap-top computer, and/or any other type of logic. Still yet, various other devices may be coupled to the network 302 including a personal digital assistant (PDA) device 308, a mobile phone device 310, a television 312, etc.

Figure 4:
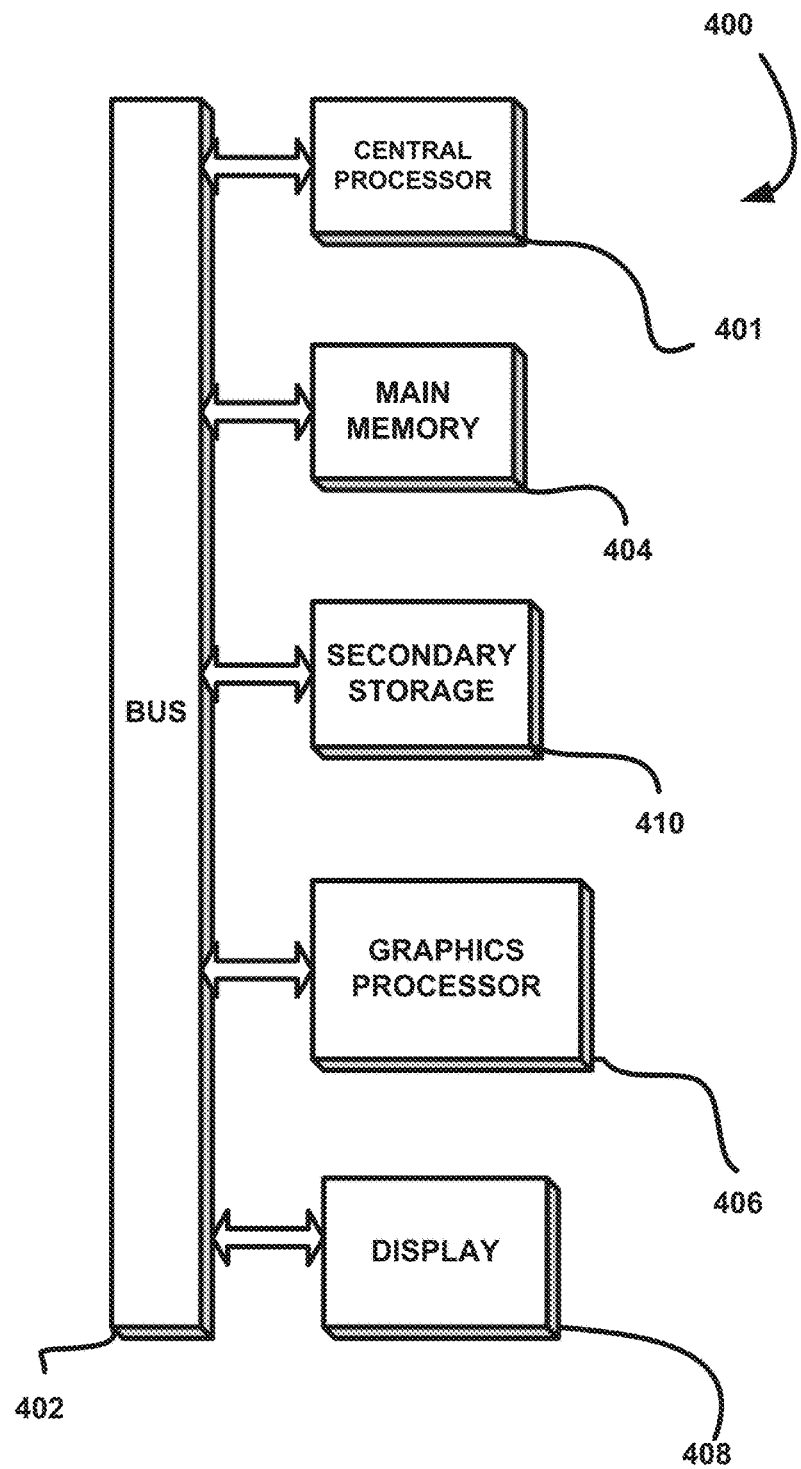
FIG. 4 illustrates an exemplary system, in accordance with one embodiment.

FIG. 4 illustrates an exemplary system 400, in accordance with one embodiment. As an option, the system 400 may be implemented in the context of any of the devices of the network architecture 300 of FIG. 3. Of course, the system 400 may be implemented in any desired environment.

As shown, a system 400 is provided including at least one central processor 401 which is connected to a communication bus 402. The system 400 also includes main memory 404 [e.g. random access memory (RAM), etc.]. The system 400 also includes a graphics processor 406 and a display 408.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404, the secondary storage 410, and/or any other memory, for that matter. Such computer programs, when executed, enable the system 400 to perform various functions (as set forth above, for example). Memory 404, storage 410 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to perform a method, comprising:
    during an initial deployment of a system, bootstrapping the system with historical ordering data that includes a plurality of past orders made by customers for telecommunications services;
    labeling, by the system, each past order in the historical ordering data to indicate whether the customer that made the past order called a call center to address a technical issue preventing completion of the past order;
    utilizing the labeled past orders to train, by the system, a classification algorithm, wherein the training results in the classification algorithm indicating that a customer that made an order will call the call center to address a technical issue preventing completion of the past order when:
    a delay occurs in association with the order, or
    when a faulty advertisement is associated with the order,
    after training the classification algorithm, receiving, by the system, a new order for a telecommunications service from a customer;
    initiating, by the system, an ordering process in response to the new order received from the customer, the ordering process including a flow of actions for completing the new order;
    predicting, in real time by a prediction module of the system applying the classification algorithm to information associated with the new order, that the customer is going to call the call center to address a technical issue that will prevent completion of the new order;
    responsive to the predicting that the customer is going to call the call center, proactively sending a message to the customer, by the system, before the customer contacts the call center to prevent the call by the customer to the call center, the message indicating that the technical issue is being addressed or has been addressed; and
    over time, updating the classification algorithm with currently received information for use in predicting whether subsequently received orders will be associated with customer calls to the call center.

2. The non-transitory computer readable medium of claim 1, wherein the message is a text message.

3. The non-transitory computer readable medium of claim 1, wherein the message is an email.

4. The non-transitory computer readable medium of claim 1, wherein the classification algorithm is part of a big data analytics platform.

5. The non-transitory computer readable medium of claim 1, further comprising computer code for predicting whether proactively sending the message to the customer will backfire.

6. The computer program product of claim 5, wherein the computer program product is operable such that the message is sent to the customer when it is determined that proactively sending the message to the customer will not backfire.

7. A method, comprising:
    during an initial deployment of a system, bootstrapping the system with historical ordering data that includes a plurality of past orders made by customers for telecommunications services;
    labeling, by the system, each past order in the historical ordering data to indicate whether the customer that made the past order called a call center to address a technical issue preventing completion of the past order;
    utilizing the labeled past orders to train, by the system, a classification algorithm, wherein the training results in the classification algorithm indicating that a customer that made an order will call the call center to address a technical issue preventing completion of the past order when:
a delay occurs in association with the order, or
when a faulty advertisement is associated with the order;
after training the classification algorithm, receiving, by the system, a new order for a telecommunications service from a customer;
initiating, by the system, an ordering process in response to the new order received from the customer, the ordering process including a flow of actions for completing the new order;
predicting, in real time by a prediction module of the system applying the classification algorithm to information associated with the new order, that the customer is going to call the call center to address a technical issue that will prevent completion of the new order;
responsive to the predicting that the customer is going to call the call center, proactively sending a message to the customer, by the system, before the customer contacts the call center to prevent the call by the customer to the call center, the message indicating that the technical issue is being addressed or has been addressed; and
over time, updating the classification algorithm with currently received information for use in predicting whether subsequently received orders will be associated with customer calls to the call center.

8. A system comprising:
a memory system; and
one or more processing cores coupled to the memory system and that are each configured to:
during an initial deployment of a system, bootstrap the system with historical ordering data that includes a plurality of past orders made by customers for telecommunications services;
label each past order in the historical ordering data to indicate whether the customer that made the past order called a call center to address a technical issue preventing completion of the past order,
utilize the labeled past orders to train a classification algorithm, wherein the training results in the classification algorithm indicating that a customer that made an order will call the call center to address a technical issue preventing completion of the past order when:
a delay occurs in association with the order, or
when a faulty advertisement is associated with the order,
after training the classification algorithm, receive a new order for a telecommunications service from a customer,
initiate an ordering process in response to the new order received from the customer, the ordering process including a flow of actions for completing the new order;
predict, in real time by a prediction module of the system applying the classification algorithm to information associated with the new order, that the customer is going to call the call center to address a technical issue that will prevent completion of the new order,
responsive to the predicting that the customer is going to call the call center, proactively send a message to the customer, before the customer contacts the call center to prevent the call by the customer to the call center, the message indicating that the technical issue is being addressed or has been addressed; and
over time, update the classification algorithm with currently received information for use in predicting whether subsequently received orders will be associated with customer calls to the call center.

* * * * *